United States Patent [19]

Claffey-Cohen et al.

[11] Patent Number: 5,608,897
[45] Date of Patent: Mar. 4, 1997

[54] PROGRAMMABLE LINEAR FEEDBACK SHIFT REGISTER TIMEOUT MECHANISM

[75] Inventors: Margaret Claffey-Cohen, Juniper; Mark G. Noll, Lake Worth; Jose A. Olive, Miami; Roberto V. Perez, Palm Beach; James P. Ward, Boca Raton, all of Fla.

[73] Assignee: International Business Machines Corporation, Armonk, N.Y.

[21] Appl. No.: 667,767

[22] Filed: Jun. 21, 1996

Related U.S. Application Data

[63] Continuation of Ser. No. 223,188, Apr. 5, 1994, abandoned.

[51] Int. Cl.$^6$ .................................................. G06F 1/14
[52] U.S. Cl. ............................................................ 395/557
[58] Field of Search .................... 395/550, 182.21, 395/183.1, 183.2, 184.01, 185.04, 185.01, 185.08; 371/61, 62, 22.1, 22.4, 25.1

[56] References Cited

U.S. PATENT DOCUMENTS

| | | | |
|---|---|---|---|
| 4,493,078 | 1/1985 | Daniels | 371/25 |
| 4,931,870 | 6/1990 | den Holander . | |
| 5,012,435 | 4/1991 | Bailey et al. | 364/569 |
| 5,095,425 | 3/1992 | Hesse . | |
| 5,138,610 | 8/1992 | Kohlmann et al. . | |
| 5,165,092 | 11/1992 | Rickenbach et al. . | |
| 5,193,193 | 3/1993 | Iyer . | |
| 5,283,904 | 2/1994 | Carson et al. | 395/725 |
| 5,289,583 | 2/1994 | Fischer et al. | 395/325 |

FOREIGN PATENT DOCUMENTS

| | | |
|---|---|---|
| 0350538 | 1/1990 | European Pat. Off. . |
| 2159287 | 4/1985 | United Kingdom . |

OTHER PUBLICATIONS

IBM Technical Disclosure Bulletin, vol. 28, No. 2, Jul. 1985 "Bit–Pushing Approach to VLSI Circuit Self–Testing", pp. 676–679.

Primary Examiner—Thomas M. Heckler
Assistant Examiner—Dennis M. Butler
Attorney, Agent, or Firm—Calfee Halter & Griswold

[57] ABSTRACT

A timeout mechanism for a computer system is provided, comprising a clocked linear feedback shift register and a programmable comparing mechanism. The linear feedback shift register comprises a series of latches serially connected to each other, and is responsive to a received interrupt signal to (i) incrementally count sequentially in the presence of the interrupt signal to provide a distinct binary vector array at the outputs of the latches for each count in the sequence and (ii) reset to a particular binary vector array in the absence of the interrupt signal. The comparing mechanism outputs a timeout command in response to the linear feedback shift register reaching a predetermined count and outputting a corresponding predetermined binary vector array at the output of the latches. The timeout mechanism uses a minimal amount of combinatorial logic, while permitting the issuance of a timeout command after the detection of an interrupt signal after any multiple of clock cycles.

17 Claims, 2 Drawing Sheets

PROGRAMMABLE LINEAR FEEDBACK SHIFT REGISTER TIMEOUT MECHANISM

This is a continuation of application Ser. No. 08/223,188 filed on Apr. 5, 1994 now abandoned.

FIELD OF THE INVENTION

The present invention relates generally to timeout mechanisms for computer systems and more particularly to a programmable timeout mechanism having an input provided by a linear feedback shift register.

BACKGROUND OF THE INVENTION

In computer systems, interrupt signals are typically used by system devices to request service of a system processor. An interrupt is a suspension of a process, such as execution of a program by the processor, which is performed in such a manner that the process can be resumed. Typically, the interrupt is implemented as an instruction that directs the microprocessor to suspend what it is doing and run a specified routine. When the routine is complete, the microprocessor resumes it original operation.

Interrupts take several forms (e.g. first-level interrupts, second-level interrupts) which indicate the relative criticality or severity of the interrupt. A particularly critical interrupt is commonly known as a non-maskable interrupt (NMI). An NMI is a hardware interrupt which takes priority over interrupts generated by software or by the keyboard or other such system devices. An NMI cannot be overruled (masked) by another service request. Non-maskable interrupts are issued to the microprocessor only in disastrous circumstances such as severe memory errors or impending power failures. A microprocessor response to an NMI is typically referred to as a "hot restart" of the system.

Because non-maskable interrupts cannot be masked and thus particularly adversely affect system operation, timeout mechanisms are often used to determine if microprocessor operation should in fact be interrupted as a result of an NMI. Timeout mechanisms determine if certain events have occurred during a prescribed time period and output a signal based on whether or not the expected event occurs. Typically, the prescribed time period defines an interval in which the expected event is to occur, such as a response to polling or addressing, before system operation is interrupted and must then be restarted. For example, the system device which issued the non-maskable interrupt could clear the interrupt. In such a situation, system performance may be enhanced by waiting a predetermined time before actually instructing the microprocessor to interrupt execution of its current operation and effect a "hot restart" of the system.

Typically, a timeout circuit is implemented using some type of binary counter. In designing binary counter timeout circuits, two design parameters of low cell count and high granularity compete with each other. Low cell count refers to the desire to minimize the number of combinatorial logic gates when implementing the circuit, and high granularity refers to the ability of a timeout circuit to issue a timeout signal within exceedingly small time intervals.

When designing a timeout circuit using a binary counter, however, higher granularity is often obtained only at the expense of adding more combinatorial logic to the circuit. Accordingly, it is an object of the present invention to provide a timeout mechanism which maximizes granularity while minimizing combinatorial logic. It is a further object of the invention to implement such a timeout mechanism using a programmable linear feed back shift register instead of a binary counter.

SUMMARY OF THE INVENTION

A timeout circuit is provided for use in a computer system which includes a microprocessor responsive to interrupt signals generated by system devices requesting service by the microprocessor. The timeout circuit may be located intermediate the microprocessor and the system devices, and comprises a non-maskable interrupt (NMI) sensing state machine, a linear feedback shift register (LFSR), a comparator and a programmable register. The circuit is used for (i) detecting the presence or absence of an interrupt signal generated by the devices, and for (ii) issuing a timeout command to the microprocessor in response to detection of an interrupt signal after a predetermined time period elapses.

The NMI sensing state machine monitors system communications to detect occurrences of non-maskable interrupts, and provides two outputs to the LFSR. The first output is related to the detection or absence of an NMI, and the second output is an enable. The function of the first output is to instruct the LFSR to count if an NMI is sensed and to inhibit counting if an NMI is either not sensed or cleared.

The LFSR comprises a plurality of latches connected in series with each other. Feedback for the LFSR is provided by the output of a single exclusive OR (XOR) gate which is fed into the data input of the first latch in the series. N latches are used to construct the LFSR, which permits the LFSR to count to provide ($2^{nth}-1$) distinct binary vector combinations at the outputs of the latches. Each of the latches is simultaneously clocked by a system clock.

Under normal operating conditions, the first output of the NMI sensing state machine is set active (high) while no NMI is detected and a "1" bit is applied to the data input of the first latch in the series. The "1" bit propagates through the N latches over the course of the next N clock cycles to reset the LFSR and provide a binary vector combination of all "1's" at the latch outputs. This signal thereby forces the LFSR to remain in an idle state when awaiting the occurrence of an NMI. When, however, the NMI sensing state machine detects an NMI, this signal is driven inactive (low) causing the LFSR to sequentially count from the all "1's" reset state to provide a distinct binary vector array at the outputs of the latches for each count in the sequence. As long as the NMI remains active, the LFSR continues to generate distinct vectors at the occurrence of each system clock.

The programmable register and the comparator are used to determine the times at which a timeout command should be issued to the microprocessor in response to an NMI being detected by the NMI sensing state machine. The comparator receives all of the outputs of the latches. The programmable register is programmed to recognize a unique binary vector of the LFSR vector series corresponding to the timeout length of interest, compare this predetermined programmed vector with the received vector, and output the timeout command to the microprocessor when the programmed and received vectors match.

DETAILED DESCRIPTION OF THE PREFERRED EMBODIMENT

Figure 1:
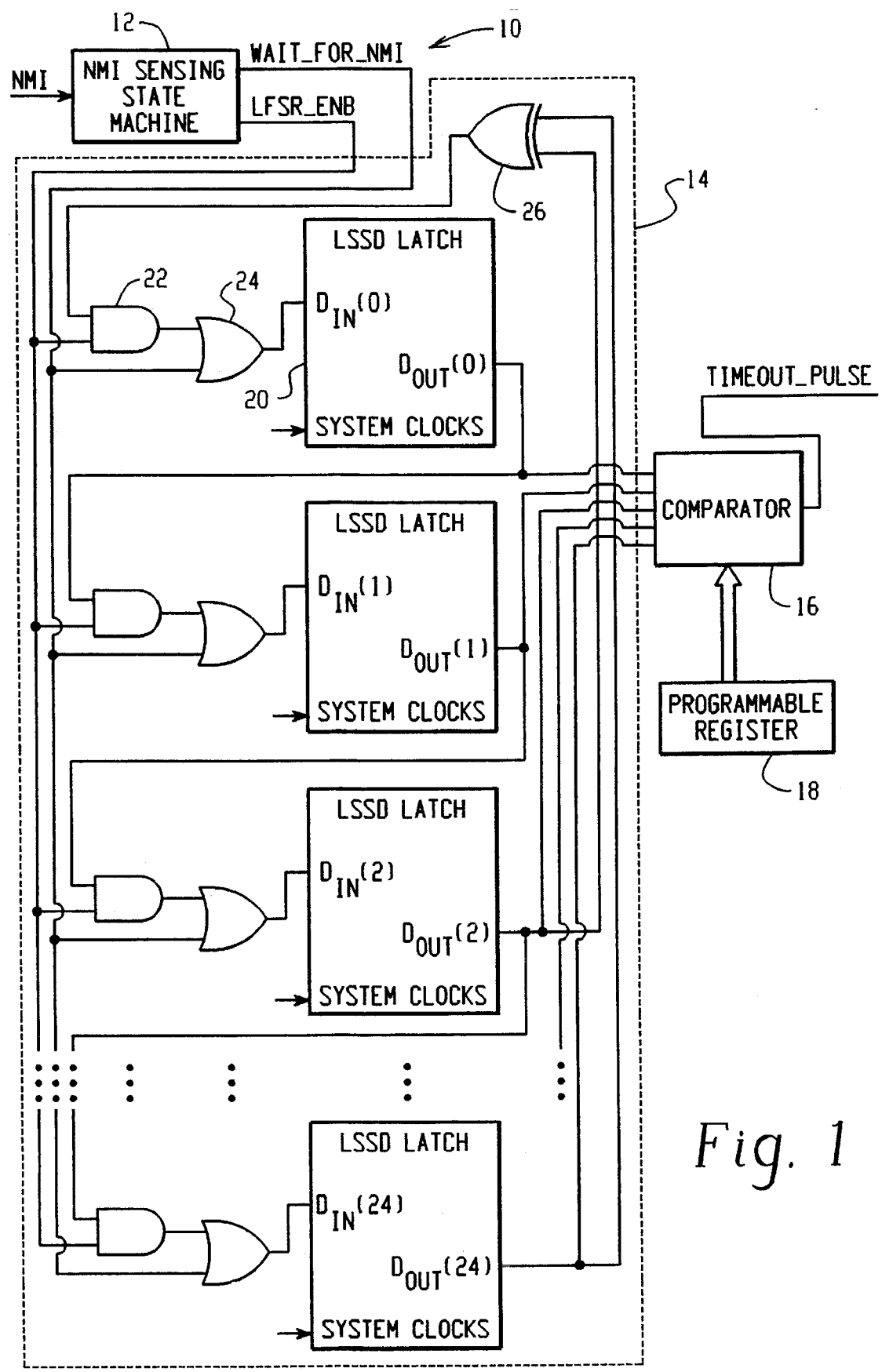
FIG. 1 is a block diagram of a timeout mechanism constructed according to the principles of the present invention.
Figure 2:
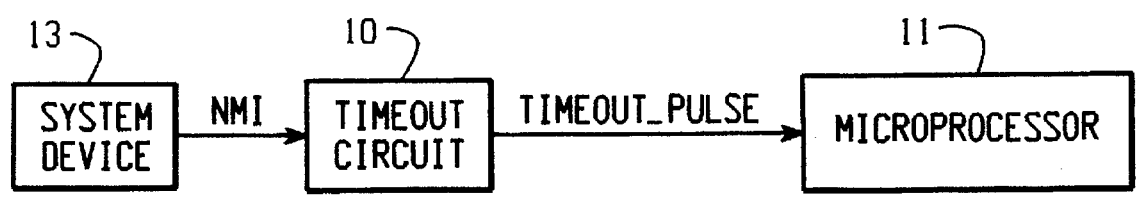
FIG. 2 is a block diagram of a computer system into which the timeout mechanism of FIG. 1 is incorporated.

A timeout circuit 10, provided by the present invention for use in a computer system, is shown in FIG. 1. Such a computer system typically includes a microprocessor 11 responsive to interrupt signals generated by devices 13 in the system which are requesting service by the microprocessor. As shown in FIG. 2, the timeout circuit 10 of FIG. 1 may be located intermediate the microprocessor and the system devices, and comprises a non-maskable interrupt (NMI) sensing state machine 12, a linear feedback shift register (LFSR) 14, a comparator 16 and a programmable register 18. The circuit 10 is used for detecting the presence or absence of an interrupt signal generated by the devices, and for issuing a timeout command to the microprocessor in response to detection of an interrupt signal after a predetermined time period elapses.

The NMI sensing state machine 12 monitors system communications to detect occurrences of non-maskable interrupts. The NMI sensing state machine provides two outputs to the LFSR 14. The first output is a WAIT_FOR_NMI signal, the generation of which is related to the detection or absence of an NMI. The WAIT_FOR_NMI signal is inactive (low) when an NMI is sensed and active (high) when no NMI is sensed or when a sensed NMI is cleared. As further explained below, the function of the WAIT_FOR_NMI signal is to instruct the LFSR 14 to count if an NMI is sensed and to inhibit counting if an NMI is either not sensed or cleared. The second output of the NMI sensing state machine 12 is an enable signal, LFSR_ENB, which merely enables the LFSR 14 to operate in the functional mode.

The LFSR 14 comprises a plurality of latches 20 connected in series with each other. Each latch 20 has associated therewith a corresponding AND gate 22 and an OR gate 24. Feedback for the LFSR 14 is provided by the output of a single exclusive OR (XOR) gate 26 which is fed into the data input of the first latch 20 through its associated AND and OR gate. Because an LFSR is used to perform the counting operations for the timeout circuit 10 instead of a binary counter, the single XOR gate provides sufficient combinatorial logic because the LFSR avoids the carry propagation associated with a conventional binary counter. In the embodiment of the invention shown in FIG. 1, twenty five latches 20 are used to construct the LFSR 14, although fewer or more than twenty five latches could be used to construct an LFSR according to the inventive principles taught herein.

For any given length LFSR comprised of n latches, a known set of primitive polynomials defines the feedback paths which enable the LFSR to count to provide $(2^{nth}-1)$ distinct binary vector combinations at the outputs of the latches. The utilization of twenty five latches in the LFSR of FIG. 1 thereby enables the LFSR 14 to count to provide $(2^{25}-1)$ such distinct binary vector combinations. Each binary vector combination is represented by a one-dimensional array (ordered set) of binary bits present at the outputs of all of the latches 20 in the series.

The primitive polynomials corresponding to an n latch LFSR may be selected from known tables. One such polynomial for a 25 latch LFSR is provided by the notation $(1+x^3+x^{25})$. This primitive polynomial defines the feedback paths for the 25 latch LFSR of FIG. 1. Thus, as shown in FIG. 1, the outputs of the third and twenty fifth latches in the series of latches are used as feedback into the LFSR.

Each of the latches 20 is simultaneously clocked by a system clock (not shown) operating at 20 megahertz (MHz), thereby providing a clock period of 50 nanoseconds (nsec). Twenty million such clock periods occur every second. Because the LFSR 14 provides $(2^{25}-1)$ or 33,554,431 distinct binary vector combinations at the outputs of the latches, a distinct vector combination may be provided for each of the twenty million clock cycles occurring each second. As explained in further detail below, this design permits a timeout mechanism having a granularity of one clock cycle, that is, within a one second time frame, the circuit 10 may issue a timeout signal at the end of any multiple of clock cycles, including one (maximum granularity).

The LFSR 14 is constructed as follows. Each of the twenty five latches (0–24) is connected to another in the series, with the output $D_{out}$ of each latch feeding the input $D_{in}$ of the next latch in the series. The outputs of the third and twenty fifth latches $D_{out}(2)$ and $D_{out}(24)$ are fed into the input of XOR gate 26. The output of the XOR gate 26 is used as an input to the first latch (0) in the series. Accordingly, as a result of this particular construction, the inputs of the latches (0–24) are defined as follows:

$D_{in}(0)$=(WAIT_FOR_NMI OR (LFSR_ENB AND ($D_{out}(2)$ XOR $D_{out}(24)$)))

$D_{in}(X)$=(WAIT_FOR_NMI OR (LFSR_ENB AND $D_{out}(X-1)$))

where X=1 through 24

The timeout circuit 10 so constructed operates as follows. Under normal operating conditions, the LFSR_ENB signal is active (high). While no NMI is detected by the NMI sensing state machine 12, the WAIT_FOR_NMI signal remains active (high) and a "1" bit is applied to the data input $D_{in}(0)$ of the first latch through its associated OR gate 24. The "1" bit propagates through the 25 latches over the course of the next 25 clock cycles to reset the LFSR and provide a binary vector combination of all "1's" at the latch outputs. The WAIT_FOR_NMI signal thereby forces the LFSR to remain in an idle state when awaiting the occurrence of an NMI.

When the NMI sensing state machine 12 detects an NMI, the WAIT_FOR_NMI signal is driven inactive (low) which causes the LFSR to sequentially count from the all "1's" reset state to provide a distinct binary vector array at the outputs of the latches for each count in the sequence. Accordingly, after each clocking period of 50 nanoseconds duration, a unique vector array is present at the latch outputs.

The programmable register 18 and the comparator 16 are used to determine the times at which a timeout command should be issued to the microprocessor in response to an NMI being detected by the NMI sensing state machine 12. The comparator receives all of the outputs $D_{out}(0-24)$ of the latches. The programmable register is programmed to recognize each possible binary vector array combination output by the latches and output the timeout command to the microprocessor in response to any one or more of the combinations. The timeout command is shown as the TIMEOUT_PULSE output of the comparator 16.

For example, if a timeout is desired under the condition wherein an NMI is sensed but not cleared after one second, the binary vector combination at the latch outputs is first determined. Because the latches are clocked at 20 MHz (50 nsec clock cycle), 20 million clock cycles will occur in the one second period, and the LFSR will have incremented 20 million counts from its all "1's" state. The programmable register may be programmed to recognize the binary vector array combination corresponding to this count, compare this programmed array with the received array, and output the timeout command to the microprocessor when the programmed and received arrays match. In the 25 latch LFSR, any one of the ($2^{25}$–1) timeout intervals may be programmed into the programmable register 18.

Accordingly, the preferred embodiment of a timeout mechanism for a computer system has been described. With the foregoing description in mind, however, it is understood that this description is made only by way of example, that the invention is not limited to the particular embodiments described herein, and that various rearrangements, modifications and substitutions may be implemented without departing from the scope of the invention as hereinafter claimed.

We claim:

1. A timeout mechanism for a computer system in which an interrupt signal is generated to temporarily suspend current operation of a microprocessor in the system, the timeout mechanism comprising:

an interrupt sensing mechanism for sensing the presence or absence of an interrupt signal and outputting a single detection signal if an interrupt signal is present;

a linear feedback shift register comprising a series of latches serially connected to each other, said linear feedback shift register having an input for receiving said detection signal and being responsive to said detection signal to (i) incrementally count sequentially solely in response to the presence of said single detection signal to provide a distinct binary vector array at the outputs of said latches for each count in the sequence, said distinct binary vector array representative of the duration of said detection signal, and (ii) reset to a particular binary vector array in the absence of said detection signal;

a system clock for clocking the operation of said linear feedback shift register to enable the incremental counting sequence;

a memory device for storing a predetermined binary vector array; and a comparing mechanism for (i) comparing said distinct binary vector array at the outputs of said latches with said predetermined binary vector array and (ii) outputting a timeout command if said distinct binary vector array matches said predetermined binary vector array.

2. The timeout mechanism of claim 1, wherein said comparing mechanism is programmable to recognize each possible binary vector array combination output by said latches and output said timeout command in response to any one or more of said combinations.

3. The timeout mechanism of claim 2, wherein said memory device comprises a programmable register.

4. The timeout mechanism of claim 2, wherein each of said latches is clocked simultaneously.

5. The timeout mechanism of claim 4, wherein said system clock operates at about 20 megahertz (MHz), providing a distinct binary vector combination at the outputs of said latches about every 50 nanoseconds (nsec).

6. The timeout mechanism of claim 4, wherein the outputs of two of said series of latches are used as inputs to a single exclusive OR (XOR) gate, the output of which is fed into the input of the first of said series of latches.

7. The timeout mechanism of claim 6, wherein said plurality of latches comprises 25 latches providing ($2^{25}$–1) distinct binary vector combinations at the outputs of said latches.

8. The timeout mechanism of claim 7, wherein the outputs of the third and twenty-fifth latches in said series are used as inputs to said exclusive OR (XOR) gate.

9. The timeout mechanism of claim 1, wherein said interrupt sensing mechanism provides an enable input to said linear feed back shift register.

10. A computer system, including a microprocessor responsive to an interrupt signal generated by a device in the system requesting service by the microprocessor, and a programmable timeout circuit disposed intermediate said microprocessor and said device for detecting the presence or absence of an interrupt signal generated by said device and for issuing a timeout command to said microprocessor in response to detection of said interrupt signal, after a predetermined time period elapses, said programmable timeout circuit comprising:

an interrupt sensing mechanism for sensing the presence or absence of an interrupt signal and outputting a single detection signal if an interrupt signal is present;

a linear feedback shift register comprising a series of latches serially connected to each other, said linear feedback shift register having an input for receiving said detection signal and being responsive to said detection signal to (i) incrementally count sequentially solely in response to the presence of said single detection signal to provide a distinct binary vector array at the outputs of said latches for each count in the sequence, said distinct binary vector array representative of the duration of said detection signal, and (ii) reset to a particular binary vector array in the absence of said detection signal;

a system clock for clocking the operation of said linear feedback shift register to enable the incremental counting sequence;

a memory device for storing a predetermined binary vector array; and a comparing mechanism for (i) comparing said distinct binary vector array at the outputs of said latches with said predetermined binary vector array and (ii) outputting said timeout command if said distinct binary vector array matches said predetermined binary vector array.

11. The computer system of claim 10, wherein said memory device comprises a programmable register.

12. The computer system of claim 10, wherein each of said latches is clocked simultaneously.

13. The computer system of claim 12, wherein said system clock operates at about 20 megahertz (MHz), providing a distinct binary vector combination at the outputs of said latches about every 50 nanoseconds (nsec).

14. The computer system of claim 12, wherein the outputs of two of said series of latches are used as inputs to a single exclusive OR (XOR) gate, the output of which is fed into the input of the first of said series of latches.

15. The computer system of claim 14, wherein said plurality of latches comprises 25 latches providing ($2^{25}$–1) distinct binary vector combinations at the outputs of said latches.

16. The computer system of claim 15, wherein the outputs of the third and twenty-fifth latches in said series are used as inputs to said exclusive OR (XOR) gate.

17. The computer system of claim 10, wherein said interrupt sensing mechanism provides an enable input to said linear feed back shift register.

* * * * *